(12) United States Patent
Cho

(10) Patent No.: US 10,605,363 B2
(45) Date of Patent: Mar. 31, 2020

(54) CLUTCH CONTROL METHOD FOR VEHICLE EQUIPPED WITH DUAL CLUTCH TRANSMISSION

(71) Applicants: Hyundai Motor Company, Seoul (KR); Kia Motors Corporation, Seoul (KR)

(72) Inventor: Sung Hyun Cho, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 56 days.

(21) Appl. No.: 16/157,578

(22) Filed: Oct. 11, 2018

(65) Prior Publication Data

US 2019/0353244 A1  Nov. 21, 2019

(30) Foreign Application Priority Data

May 21, 2018 (KR) ........................ 10-2018-0057941

(51) Int. Cl.
| | |
|---|---|
| *F16H 61/688* | (2006.01) |
| *F16D 48/06* | (2006.01) |
| *F16H 59/56* | (2006.01) |
| *F16H 59/14* | (2006.01) |
| *F16H 59/70* | (2006.01) |

(52) U.S. Cl.
CPC ......... *F16H 61/688* (2013.01); *F16D 48/062* (2013.01); *F16D 2500/10412* (2013.01); *F16D 2500/30404* (2013.01); *F16D 2500/30406* (2013.01); *F16D 2500/30421* (2013.01); *F16D 2500/30806* (2013.01); *F16D 2500/5026* (2013.01); *F16D 2500/50251* (2013.01); *F16D 2500/50266* (2013.01); *F16H 59/14* (2013.01); *F16H 59/56* (2013.01); *F16H 59/70* (2013.01); *F16H 2342/042* (2013.01)

(58) Field of Classification Search
None
See application file for complete search history.

(56) References Cited

U.S. PATENT DOCUMENTS 8,725,372 B2  5/2014 Rinck et al.

FOREIGN PATENT DOCUMENTS

| JP | 2011-161982 A | 8/2011 |
|---|---|---|
| JP | 2013-035403 A | 2/2013 |

(Continued)

*Primary Examiner* — Timothy Hannon
(74) *Attorney, Agent, or Firm* — Morgan, Lewis & Bockius LLP

(57) ABSTRACT

A clutch control method of the vehicle provided with the double clutch transmission may include determining, by the controller, whether a vehicle is travelling at the lowest shifting stage or the highest shifting stage and the pre-engagement of a proximate shifting stage is completed or not; storing a learned driveshaft clutch torque and a current clutch temperature and initiating a timer when it is determined that the learned driveshaft clutch torque is considered reliable by the controller learning the driveshaft clutch torque; determining, by the controller, a plurality of conditions including the passage of time to determine whether a touch point learning of the non-driveshaft clutch is necessary or not; and disengaging, by the controller, the proximate shifting stage of the non-driveshaft to neutral when it is determined that the touch point learning is necessary and performing the touch point learning of non-driveshaft.

5 Claims, 3 Drawing Sheets

(56) References Cited

FOREIGN PATENT DOCUMENTS

| KR | 10-1355620 B1 | 1/2014 |
| KR | 10-2014-0055192 A | 5/2014 |
| KR | 10-1694071 B1 | 1/2017 |
| KR | 10-1755851 B1 | 7/2017 |

CLUTCH CONTROL METHOD FOR VEHICLE EQUIPPED WITH DUAL CLUTCH TRANSMISSION

CROSS REFERENCE TO RELATED APPLICATION

The present application claims priority to Korean Patent Application No. 10-2018-0057941 filed on May 21, 2018, in the Korean Intellectual Property Office, the entire contents of which is incorporated herein for all purposes by this reference.

BACKGROUND OF THE INVENTION

Field of the Invention

The present invention relates to a clutch control method of a vehicle provided with a double clutch transmission (DCT) and more particularly, a technique for updating the touch point of the clutch.

Description of Related Art

A Dual Clutch Transmission (DCT) enables rapid and smooth shifting through the pre-engagement of a shifting stage of a non-driveshaft.

When a vehicle travels at the highest shifting stage or the lowest shifting stage, since it is almost certain that the next shifting is performed to the shifting stage of the highest shifting stage −1 stage or the lowest shifting stage +1 stage as a proximate shifting stage of the highest shifting stage and the lowest shifting stage, respectively, the proximate shifting stage of the non-driveshaft is pre-engaged and the condition thereof tends to be maintained constantly.

However, in a case where a high speed travel is performed for a long time in a wide country such as China or the United States, the highest shifting stage −1 stage as the proximate shifting stage of the non-driveshaft constantly maintains the pre-engagement state while a driveshaft is continuously rotating for a long time at the highest shifting stage. In the present pre-engagement state, there is no opportunity to learn the touch point of the non-driveshaft clutch so that the learned touch point may be significantly different from the actual touch point, which may cause problems such as shock generation or an engine flare in which an engine rotation speed unexpectedly rises when the shifting is performed while engaging the non-driveshaft clutch in the future.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a clutch control method of a vehicle provided with a double clutch transmission configured for preventing shift quality from being deteriorated and ensuring stable and smooth shift feel by allowing a non-driveshaft clutch to properly update its touch points in a situation where the touch point of the non-driveshaft clutch becomes inaccurate because the proximate shifting stage of the non-driveshaft keeps the pre-engagement state for a long time as the vehicle provided with DCT travels for a long time at the highest shifting stage or the lowest shifting stage.

A clutch control method of a vehicle provided with a double clutch transmission according to an exemplary embodiment of the present invention may include determining, by the controller, whether a vehicle is travelling at the lowest shifting stage or the highest shifting stage and the pre-engagement of a proximate shifting stage is completed or not; storing a learned driveshaft clutch torque and a current clutch temperature and initiating a timer when it is determined that the learned driveshaft clutch torque is considered reliable by the controller learning the driveshaft clutch torque; determining, by the controller, a plurality of conditions including the passage of time to determine whether a touch point learning of the non-driveshaft clutch is necessary or not; disengaging, by the controller, the proximate shifting stage of the non-driveshaft to neutral when it is determined that the touch point learning is necessary and performing the touch point learning of non-driveshaft; and updating, by the controller, the touch point of the non-driveshaft to the learned value when the touch point learning is completed and pre-engaging the disengaged proximate shifting stage again; and the updated touch point is used when controlling the non-driveshaft clutch later.

The controller may learn the driveshaft clutch torque while controlling the driveshaft clutch in a small slip condition and determine that the learned driveshaft clutch torque is a reliable level when the difference between the learned driveshaft clutch torque and engine torque is less than a predetermined reference torque.

The controller may repeatedly learn the driveshaft clutch torque over time and acquires clutch temperature; and determine that the touch point learning of the non-driveshaft clutch is necessary when the difference between the newly learned driveshaft clutch torque and the stored driveshaft clutch torque exceeds a predetermined first reference value, the difference between the newly acquired clutch temperature and the stored clutch temperature exceeds a predetermined second reference value, and the elapsed time measured by the timer is equal to or greater than a predetermined third reference value.

The clutch temperature may include temperatures of a center plate, a first pressurizing plate and a second pressurizing plate of the clutch.

The controller may repeatedly learn the touch point of non-driveshaft clutch to determine that the touch point learning of the non-driveshaft is completed when the difference between the currently learned touch point and the previously learned touch point is equal to or less than a fourth reference value.

The present invention is configured to prevent shift quality from being deteriorated and ensure stable and smooth shift feel by allowing the non-driveshaft clutch to properly update its touch points in a situation where the touch point of the non-driveshaft clutch becomes inaccurate because the proximate shifting stage of the non-driveshaft keeps the pre-engagement state for a long time as the vehicle provided with DCT travels for a long time at the highest shifting stage or the lowest shifting stage.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
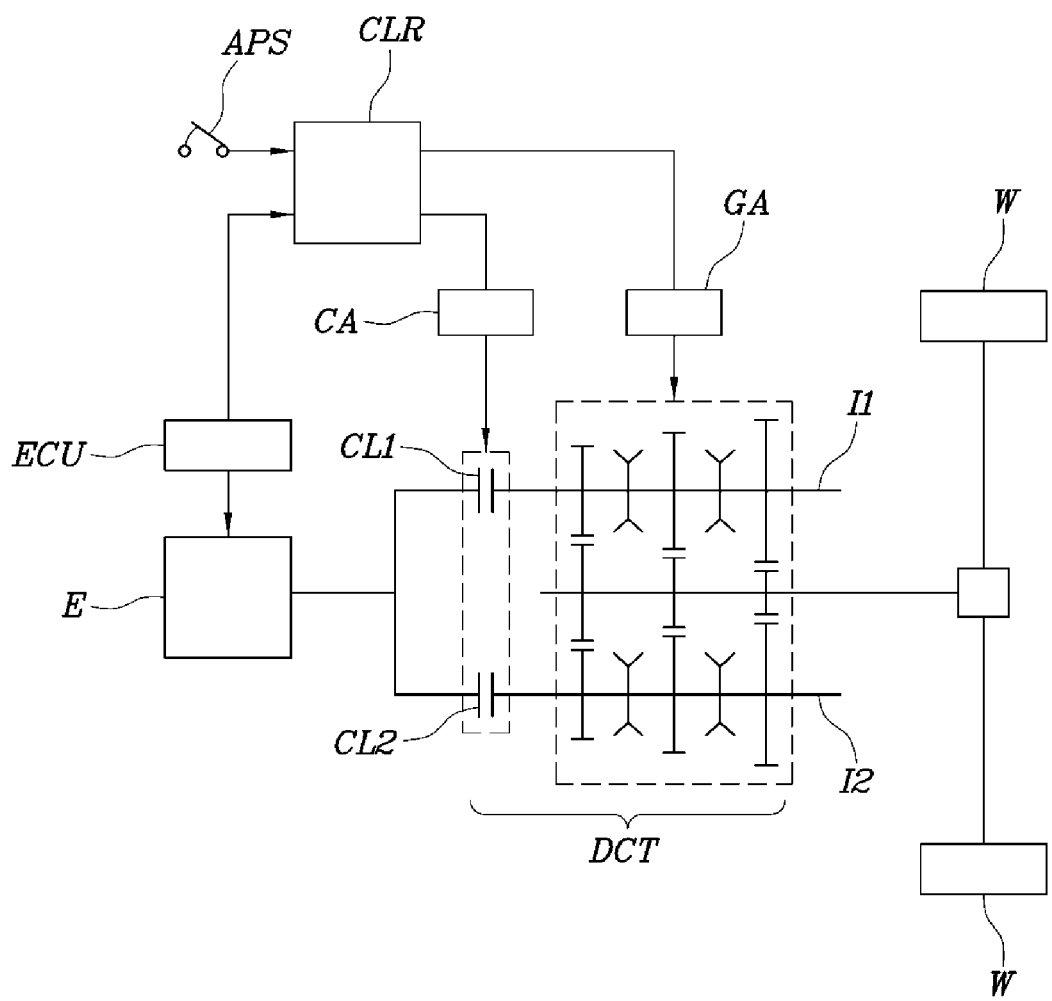
FIG. 1 is a drawing illustrating the configuration of a vehicle provided with DCT to which the present invention may be applied.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

FIG. 1 is a drawing illustrating the configuration of a vehicle provided with DCT to which the present invention may be applied. The power of the engine E is selectively provided to two input shafts I1 and I2 via two clutches CL1 and CL2 of the DCT, and the power of which shifting has been completed in the DCT is supplied to a drive wheel W.

A controller CLR may be connected to an ECU (Engine Control Unit) to receive information such as engine torque and request torque reduction to the engine E and connected to control a clutch actuator CA, which controls the two clutches of the DCT, and a gear actuator GA, which changes the gear engagement state of the DCT.

The controller CLR may be configured to receive the signal of an accelerator pedal sensor (APS) and configured to receive the rotation speed of each input shafts I1 and I2 of the DCT, etc.

The two input shafts I1 and I2 may be divided one the input shaft which implements the current shifting stage and transmits driving torque and the other input shaft which will be used to implement the new target shifting stage and does not transmit driving torque. Hereinafter, the input shaft that implements the current shifting stage and transmits driving is referred to as a "driveshaft", and the input shaft that does not transmit driving torque to be used for the new target shifting stage is referred to as a "non-driveshaft".

Furthermore, a clutch connected to the driveshaft is referred to as a "driveshaft clutch" and a clutch connected to the non-driveshaft is referred to as a "non-driveshaft clutch".

On the other hand, one of the two input shafts may be configured to be used primarily to implement odd shifting stages and referred to as an odd-numbered shaft, while the other input shaft may be configured to be used to implement even shifting stages and an R-stage as a reverse shifting stage and referred to as an even-numbered shaft. For example, in the case of a forward six stages transmission, the odd-numbered shafts may be configured to implement 1, 3, and 5-stage, and the even-numbered shafts may be configured to implement 2, 4, 6 and R-stage.

Figure 2:
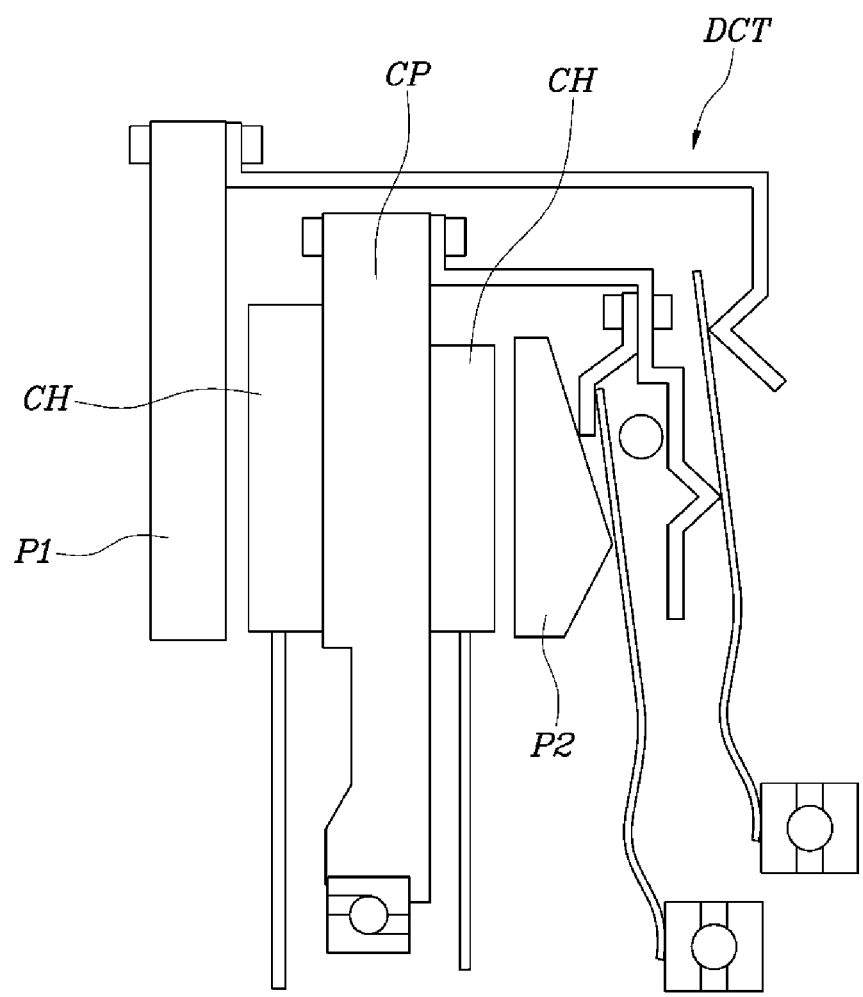
FIG. 2 is a conceptual diagram of the configuration of the DCT to which the present invention may be applied.

FIG. 2 explains schematically the structure of the DCT as a partial cross-sectional view, clutch plates CH may be provided at both sides of a center plate CP, and a first pressurizing plate P1 and a second pressurizing plate P2 for selectively pressurizing the clutch plates CH to the center plate CP to transmit power may be provided. The two center plates CP may be connected to the two input shafts I1 and I2, respectively, so that the power from a power source such as an engine may be transmitted to each input shafts I1 and I2.

Figure 3:
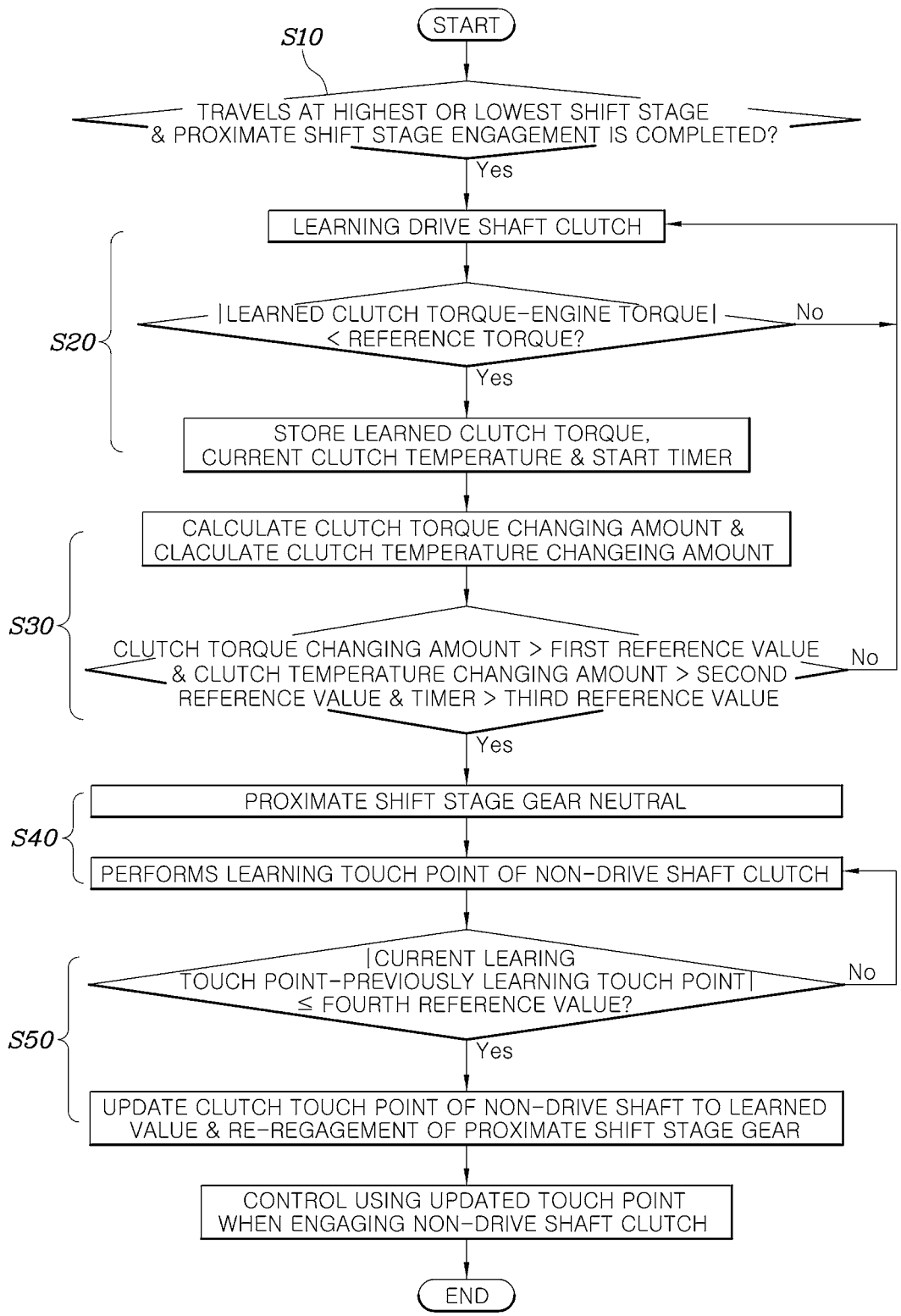
FIG. 3 is a flowchart illustrating an exemplary embodiment of a clutch control method of a vehicle with a double clutch transmission according to an exemplary embodiment of the present invention.

Referring to FIG. 3, an exemplary embodiment of a clutch control method of a vehicle provided with a double clutch transmission according to an exemplary embodiment of the present invention may include a pre-engagement confirmation step S10 of determining, by the controller CLR, whether a vehicle is travelling at the highest shifting stage or the highest shifting stage and the pre-engagement of the proximate shifting stage is completed or not; a timer start step S20 of storing a learned driveshaft clutch torque and a current clutch temperature and initiating a timer when it is determined that the learned driveshaft clutch torque is considered reliable by the controller CLR learning the driveshaft clutch torque; a condition determination step S30 of determining, by the controller CLR, a plurality of conditions including the passage of time to determine whether the touch point learning of the non-driveshaft clutch is necessary or not; a touch point learning step S40 of disengaging, by the controller CLR, the proximate shifting stage of the non-driveshaft to neutral when it is determined that the touch point learning is necessary and performing the touch point learning of non-driveshaft; and a re-engagement step S50 of updating, by the controller CLR, the touch point of the non-driveshaft to the learned value when the touch point learning is completed and pre-engaging the disengaged proximate shifting stage again; and the updated touch point is used when controlling the non-driveshaft clutch later.

For example, in a case where the DCT can implement the forward six stages as described above, the lowest shifting stage becomes a first shifting stage, the highest shifting stage becomes a sixth shifting stage, and the proximate shifting stage becomes a second shifting stage or a fifth shifting stage. When the vehicle travels at the lowest shifting stage, the proximate shifting stage becomes the second shifting stage, whereas the proximate shifting stage becomes the fifth shifting stage when travels at the highest shifting stage.

Thus, in the case of running at the sixth shifting stage as the highest shifting stage, the driveshaft becomes the even-numbered shaft and the non-driveshaft becomes the odd-numbered shaft, and the proximate shifting stage is pre-engaged.

The controller CLR may learn the driveshaft clutch torque while controlling the driveshaft clutch in a small slip condition.

That is, the controller CLR may set the engine torque to the clutch torque from the relationship that the engine torque is equal to the clutch torque during the slight slip is constantly maintained while causing and maintaining a slight slip in the driveshaft clutch of less than 100 RPM and updates a T-S curve by use of the relationship between the clutch torque and a clutch actuator stroke forming the clutch torque.

Herein, the T-S curve (Torque-Stroke curve) is a graph showing the relationship between the clutch torque and the clutch actuator stroke, which allows determining the clutch actuator stroke for forming the desired clutch torque when the controller CLR controls the clutch.

The controller CLR may determine that the learned driveshaft clutch torque is at a reliable level when the difference between the learned driveshaft clutch torque and engine torque is less than a predetermined reference torque.

Of course, the controller CLR can receive the engine torque from the ECU to compare the learned driveshaft clutch torque, and if the difference is less than the reference torque, for example 10 Nm to 20 Nm, the controller CLR can determine that the learned driveshaft clutch torque is reliable.

As like this, the reason that the controller CLR learns the driveshaft clutch torque is to prevent all the non-driveshaft clutch torque characteristics and the driveshaft clutch torque characteristics from being unexpectedly in an inaccurate state during learning the touch point of the non-driveshaft or by the learning later, by learning the touch point of the non-driveshaft thereafter to accurately grasp the clutch torque characteristics of the driveshaft firstly before the touch point is changed.

The controller CLR may repeatedly learn the driveshaft clutch torque and acquire the clutch temperature over time.

Using the newly learned driveshaft clutch torque and clutch temperature, the controller CLR may determine the condition for determining whether it needs to learn the touch point of the non-driveshaft clutch. That is, the controller CLR may determine that it needs to learn the touch point of the non-driveshaft clutch when the difference between the newly learned driveshaft clutch torque and the stored driveshaft clutch torque exceeds a predetermined first reference value, the difference between the newly acquired clutch temperature and the stored clutch temperature exceeds a predetermined second reference value, and the elapsed time measured by the timer is equal to or greater than a predetermined third reference value.

For example, when the difference between the newly learned driveshaft clutch torque and the stored driveshaft clutch torque exceeds the first reference value, for example 0.5 mm, when converted into the clutch actuator stroke, the difference between the newly acquired clutch temperature and the stored clutch temperature exceeds the second reference value, for example 30° C., and the elapsed time measured by the timer is equal to or greater than a predetermined third reference value, for example 5 minutes, the controller CLR may determine that the touch point of the non-driveshaft is meaningfully changed, determining that it needs to learn the touch point of the non-driveshaft clutch.

Therefore, the first reference value to the third reference value are not limited to the illustrated values but are appropriately selected to be at a level where it may be determined that it is necessary to update the touch point of the non-driveshaft according to the technical purpose described above.

On the other hand, the clutch temperature may include the temperature at the center plate CP of the clutch, the temperature of the first pressurizing plate P1 and the temperature of the second pressurizing plate P2.

The controller CLR may be able to acquire the clutch temperature through a temperature sensor or temperature model, determine the temperature change of the clutch by setting the average temperature value of the center plate CP, the first pressure plate P1 and the second pressure plate P2 as the clutch temperature, determine the temperature change of the clutch based on the severest temperature change among these three parts, and determine the temperature change of the clutch by setting the weighted average value obtained by applying different weight values to the three parts as the clutch temperature.

In either case, it is, as a result, sufficient that the method can reflect the change of the touch point of the non-driveshaft clutch by the temperature change of the clutch.

The controller CLR may repeatedly learn the touch point of the non-driveshaft clutch, and determine that the touch point learning of the non-driveshaft is completed when the difference between the currently learned touch point and the previously learned touch point is equal to or less than a predetermined fourth reference value.

That is, the controller CLR repeatedly learns the touch point of the non-driveshaft clutch to determine that the touch point learning of the non-driveshaft is completed when the difference from the previous learning value is below a certain level. Herein, the fourth reference value may be determined in a design manner by experiment and analysis according to the above-mentioned purpose, and determined as 0.5 mm and the like, for example, to convert into the clutch actuator stroke.

As a reference, as a method of learning the touch point of the clutch, a method of learning the clutch actuator stroke detected as that the angular acceleration of the clutch is suddenly changed while releasing the clutch and then slowly engaging by the touch point, and the like may be used.

Once, the touch point learning of the non-driveshaft is completed, the controller CLR updates the touch point of the non-driveshaft to the learned value and pre-engages the released proximity shifting stage to prepare for future shifting.

Of course, the controller CLR utilizes the updated touch point to control the non-driveshaft clutch when controls the non-driveshaft clutch later, preventing shift shock or engine flare by utilizing the correct touch point.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch control method of a vehicle provided with a double clutch transmission, the clutch control method comprising:

determining, by a controller, when the vehicle is travelling at a lowest shifting stage or a highest shifting stage and pre-engagement of a proximate shifting stage is completed;

learning a driveshaft clutch torque by the controller;

storing a learned driveshaft clutch torque and a current clutch temperature and initiating a timer when the controller determines that the learned driveshaft clutch torque is considered reliable by the controller learning the driveshaft clutch torque;

determining, by the controller, a plurality of conditions including passage of time to determine when a touch point learning of a non-driveshaft clutch is necessary;

disengaging, by the controller, the proximate shifting stage of a non-driveshaft to a neutral when the controller determines that the touch point learning is necessary and performing the touch point learning of the non-driveshaft; and updating, by the controller, a touch point of the non-driveshaft to a learned value when the touch point learning is completed and pre-engaging the disengaged proximate shifting stage again; and wherein the updated touch point is used by the controller when controlling the non-driveshaft clutch later.

2. The clutch control method of the vehicle provided with the double clutch transmission of claim 1, wherein the controller learns the driveshaft clutch torque while controlling a driveshaft clutch in a small slip condition and determines that the learned driveshaft clutch torque is reliable when a difference between the learned driveshaft clutch torque and an engine torque is less than a predetermined reference torque.

3. The clutch control method of the vehicle provided with the double clutch transmission of claim 1, wherein the controller repeatedly learns the driveshaft clutch torque over time and acquires clutch temperature, and determines that the touch point learning of the non-driveshaft clutch is necessary when a difference between a newly learned driveshaft clutch torque and the stored driveshaft clutch torque exceeds a predetermined first reference value, a difference between a newly acquired clutch temperature and a stored clutch temperature exceeds a predetermined second reference value, and an elapsed time determined by the timer is equal to or greater than a predetermined third reference value.

4. The clutch control method of the vehicle provided with the double clutch transmission of claim 3, wherein the stored clutch temperature includes temperatures of a center plate, a first pressurizing plate and a second pressurizing plate of the double clutch transmission in a first time, and wherein the newly acquired clutch temperature includes temperatures of the center plate, the first pressurizing plate and the second pressurizing plate of the double clutch transmission in a second time, which is subsequent to the first time.

5. The clutch control method of the vehicle provided with the double clutch transmission of claim 1, wherein the controller repeatedly learns the touch point of the non-driveshaft clutch to determine that the touch point learning of the non-driveshaft is completed when a difference between a currently learned touch point and a previously learned touch point is equal to or less than a fourth reference value.

* * * * *